H. W. HOTCHKISS & J. MERTZ.
SANITARY HOG TROUGH.
APPLICATION FILED NOV. 17, 1915.
1,208,967.
Patented Dec. 19, 1916.
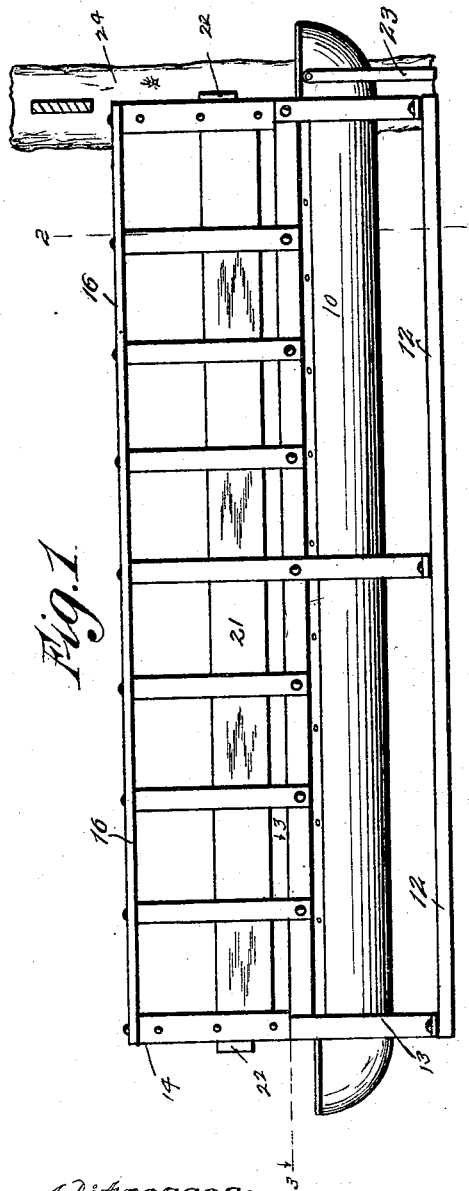
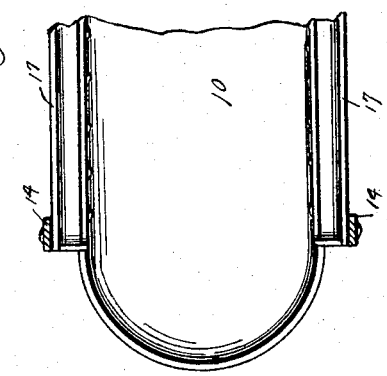
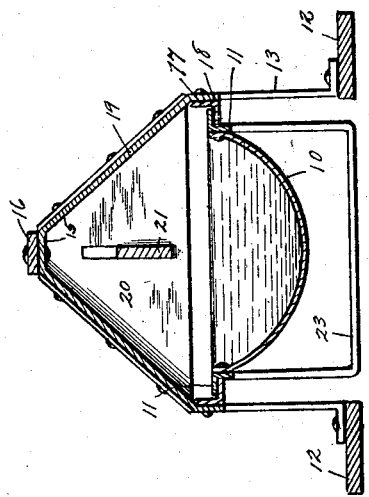

UNITED STATES PATENT OFFICE.

HARRY W. HOTCHKISS AND JAMES MERTZ, OF WEBSTER CITY, IOWA; SAID MERTZ ASSIGNOR TO SAID HOTCHKISS.

SANITARY HOG-TROUGH.

1,208,967.  Specification of Letters Patent.  Patented Dec. 19, 1916.

Application filed November 17, 1915. Serial No. 62,063.

*To all whom it may concern:*

Be it known that we, HARRY W. HOTCHKISS and JAMES MERTZ, citizens of the United States, and residents of Webster City, in the county of Hamilton and State of Iowa, have invented a certain new and useful Sanitary Hog-Trough, of which the following is a specification.

The object of our invention is to provide a trough for hogs and the like of comparatively simple, and inexpensive construction.

A further object is to provide such a stock trough having means so arranged that the animals feeding from the trough may be kept separate from each other as to the animals on one side of the trough, and also whereby the animals on one side may be kept from interfering with the animals on the other side of the trough.
A further object is to provide such a trough with means for mounting the same, whereby the trough may be removed from the supporting frame for cleaning and the like.
Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a side elevation of a trough embodying our invention. Fig. 2 shows a vertical, transverse, sectional view, through the same, taken on the line 2—2 of Fig. 1 and Fig. 3 shows a horizontal, sectional view taken on the line 3—3 of Fig. 1.

In the form of our invention, shown in the accompanying drawings, we have used the reference numeral 10 to indicate generally the trough part comprising a channel-shaped member. Secured to the upper side edges of the trough are angle bars 11, having one downwardly extending flange and the other extending laterally away from the trough, as clearly shown in Fig. 2.

Our improved trough is mounted for longitudinal sliding movement on a frame comprising two spaced longitudinally arranged post members 12, placed on opposite sides of the trough and designed to rest on the ground or the like.

Bracket members 13 extend upwardly from the members 12 and at points just above the level of the trough are bent inwardly and upwardly toward each other, to form members 14. The members 14 are connected at their upper ends by a horizontal member 15. The members 15, 14 and 13 are preferably formed integral with each other, and as many of such bracket members may be employed as may be desired.

A longitudinally arranged bar 16 is mounted on top of the members 15 and secured thereto for properly reinforcing and supporting them and making a rigid construction.

Secured to the upper ends of the members 13 on the inner sides thereof are upright flanges of angle bars 17. At the lower edges of the upright flanges of the angle bars 17 are inwardly extending horizontal flanges, shown in Fig. 2, so located as to slidingly support the horizontal flanges of the angle bars 11.

Secured to the upright flanges of the angle bars 17 are the upright lower ends of bars 18. At the upper edges of the angle bars 17, the bars 18 are extended inwardly and upwardly at 19. The upper ends of the portion 19 are connected by portions 15 similar to those already described, as forming parts of the brackets.

At each end of the trough, a metal plate 20 is mounted on the bracket members 14, so as to form a closed end for the frame. The members 20 perform a double function. A longitudinally arranged board or the like 21 is arranged above the central portion of the trough, and is provided with extensions 22 at its ends, which are of less width than the main body of the portion 21, which extensions 22 are received in the members 20. The members 20 support the board 21. It is desirable to have the board 21 for preventing the animals on opposite sides of the trough from interfering with each other. In such a trough as this, if the ends are not closed by some such device as the plate 20, the hogs or other animals sometimes stick their heads into the trough from the ends thereof, and become caught between the board and the trough. This difficulty is avoided by the use of the plate 20. It will readily be seen that the trough 10 will readily slide upon the lower flanges of the angle irons 17.

Pivoted to the sides of the trough, at one end thereof are the arms of a bail handle member 23, which handle member normally hangs downwardly, but may be grasped and swung outwardly at the end of the trough for drawing the trough out of the frame for cleaning it.

The ends of the trough preferably project beyond the frame. One end of the trough may be extended through the fence 24, as shown in Fig. 1, whereby the trough may be filled without interference of the feeding animals.

The trough 10 is preferably made of metal, as are the other parts with the possible exception of the members 12 and 16, although various materials may be used.

It will be seen that such a trough as ours is very durable and also that it can be very easily and quickly cleaned with a hose or otherwise.

It will be understood that some changes may be made in the construction and arrangement of the parts of our improved hog trough, without departing from its essential features and purposes, and it is our intention to cover by this application any such changes which may be included within the scope of the following claims.

We claim as our invention:

1. In a trough, a supporting frame consisting of a pair of longitudinal angle bars having their flanges extending horizontally toward each other, spaced supporting and partition members fastened to the outside flange of the angle bars, comprising vertical portions extending downwardly from the angle bars and portions extending upwardly and inwardly from the same point, connected at their upper ends by horizontal portions, also space partition members extending upwardly and inwardly from the angle bars with a horizontal connecting portion, a longitudinal bar attached to each horizontal connecting portion, a pair of plates extending transversely upwardly from the angle bars to the end partition members, and a trough slidably mounted on said angle bars.

2. In a trough, a supporting frame comprising a pair of longitudinal angle bars, each having a frame extending horizontally toward each other, spaced supporting and partition members extending to the vertical flange of the angle bars, comprising a vertical portion extending downwardly from the angle bars, a portion extending upwardly and inwardly from the same point, connected at their upper ends by horizontal portions, also spaced partition members extending upwardly and inwardly from the angle bars with a horizontal connecting portion, a longitudinal bar attached to each connecting portion and a trough slidably mounted on said angle bars.

Des Moines, Iowa, November 8, 1915.

HARRY W. HOTCHKISS.
JAMES MERTZ.

Copies of this patent may be obtained for five cents each, by addressing the "Commissioner of Patents, Washington, D. C."